US010057217B2

United States Patent
Lock et al.

(10) Patent No.: US 10,057,217 B2
(45) Date of Patent: Aug. 21, 2018

(54) SYSTEM AND METHOD TO SECURE SENSITIVE CONTENT IN A URI

(71) Applicant: SAP SE, Walldorf (DE)

(72) Inventors: Hendrik Lock, Linkenheim-Hochstetten (DE); Iouri Loukachev, Walldorf (DE); Wolfgang Janzen, Mannheim (DE); Alexey Arseniev, Hockenheim (DE)

(73) Assignee: SAP SE, Walldorf (DE)

( * ) Notice: Subject to any disclaimer, the term of this patent is extended or adjusted under 35 U.S.C. 154(b) by 776 days.

(21) Appl. No.: 14/331,896

(22) Filed: Jul. 15, 2014

(65) Prior Publication Data

US 2016/0021064 A1    Jan. 21, 2016

(51) Int. Cl.
*H04L 29/06* (2006.01)
*G06F 17/30* (2006.01)

(52) U.S. Cl.
CPC .... *H04L 63/0428* (2013.01); *G06F 17/30887* (2013.01); *H04L 69/04* (2013.01)

(58) Field of Classification Search
USPC .......................................................... 726/26
See application file for complete search history.

(56) References Cited

U.S. PATENT DOCUMENTS

| | | | |
|---|---|---|---|
| 6,434,561 B1* | 8/2002 | Durst, Jr. | H04N 1/33323 |
| 7,035,914 B1* | 4/2006 | Payne | G08B 25/085 340/7.29 |
| 7,512,651 B2 | 3/2009 | Offermann | |
| 8,019,788 B1* | 9/2011 | Carter | G06F 17/30153 707/602 |
| 8,108,362 B2 | 1/2012 | Hydrie et al. | |
| 8,302,204 B2 | 10/2012 | Grummt | |
| 8,316,443 B2 | 11/2012 | Rits et al. | |
| 8,327,254 B2* | 12/2012 | Chen | G06Q 30/0269 715/205 |
| 8,417,588 B2 | 4/2013 | Ringl et al. | |
| 8,479,298 B2* | 7/2013 | Keith | H04L 63/0428 713/168 |
| 8,843,736 B2* | 9/2014 | Pedlow | H04L 63/0807 713/151 |
| 2002/0107982 A1 | 8/2002 | Teodosiu et al. | |
| 2003/0037232 A1* | 2/2003 | Bailiff | G06F 21/6263 713/153 |
| 2004/0199762 A1 | 10/2004 | Carlson et al. | |

(Continued)

OTHER PUBLICATIONS

Dong et al., Protecting Sensitive Web Content from Client-side Vulnerabilities with Cryptons, ACM 2013, 14 pages (Year: 2013).*

(Continued)

*Primary Examiner* — Jeffrey C Pwu
*Assistant Examiner* — Baotram Tran
(74) *Attorney, Agent, or Firm* — Jones Day

(57) ABSTRACT

A system and method for transmitting data using a data transfer protocol, including receiving, at the first device, a request from the second device, the request containing a transformed identifier, determining an original identifier associated with the transformed identifier, retrieving a response object associated with the original identifier, the response object including one or more identifiers, transforming the response object by transforming each identifier contained in the response object, and sending the transformed response object to the second device.

20 Claims, 5 Drawing Sheets

(56) References Cited

U.S. PATENT DOCUMENTS

| | | | |
|---|---|---|---|
| 2006/0106802 A1* | 5/2006 | Giblin | G06F 17/30876 |
| 2006/0117033 A1* | 6/2006 | Apparao | G06F 17/2205 |
| 2008/0263650 A1 | 10/2008 | Kerschbaum | |
| 2008/0294676 A1* | 11/2008 | Faerber | H03M 7/30 |
| 2009/0060178 A1* | 3/2009 | Montgomery | G06F 21/6209 |
| | | | 380/44 |
| 2009/0094236 A1* | 4/2009 | Renkes | G06F 17/30336 |
| 2009/0274294 A1* | 11/2009 | Itani | H03M 7/30 |
| | | | 380/28 |
| 2010/0054242 A1 | 3/2010 | Oliver et al. | |
| 2010/0125604 A1 | 5/2010 | Martinez et al. | |
| 2011/0296200 A1* | 12/2011 | Sibert | H03M 7/3088 |
| | | | 713/189 |
| 2012/0030774 A1* | 2/2012 | Keith | H04L 63/0428 |
| | | | 726/30 |
| 2012/0036365 A1* | 2/2012 | Kyslov | G06F 17/30038 |
| | | | 713/176 |
| 2012/0151224 A1* | 6/2012 | Koifman | G06F 12/1408 |
| | | | 713/193 |
| 2012/0246485 A1* | 9/2012 | Norimoto | G06F 21/6209 |
| | | | 713/189 |
| 2013/0114626 A1* | 5/2013 | Bellessort | H04L 69/04 |
| | | | 370/477 |
| 2013/0117576 A1* | 5/2013 | Kataoka | G06F 17/30153 |
| | | | 713/189 |
| 2013/0321182 A1* | 12/2013 | Cheng | H03M 7/30 |
| | | | 341/87 |
| 2013/0325874 A1* | 12/2013 | Weyerhaeuser | G06F 17/30321 |
| | | | 707/743 |
| 2014/0129830 A1* | 5/2014 | Raudaschl | G06F 21/6218 |
| | | | 713/165 |
| 2014/0176353 A1* | 6/2014 | Pardo | H03M 7/6023 |
| | | | 341/87 |
| 2015/0032684 A1* | 1/2015 | Gupta | G06F 17/30575 |
| | | | 707/600 |
| 2015/0033008 A1* | 1/2015 | Einarsson | H04L 63/0428 |
| | | | 713/150 |
| 2015/0379073 A1* | 12/2015 | Verma | G06F 17/30442 |
| | | | 707/715 |
| 2016/0198202 A1* | 7/2016 | Van Brandenburg | H04N 21/26258 |
| | | | 725/31 |

OTHER PUBLICATIONS

Clint Hall, Web Presentation Layer Bootstrapping for Accessibility and Performance, ACM 2009, 8 pages (Year: 2009).*

Park et al., An Adaptive Streaming Techinique for Interactive Medical Systems in Mobile Environment, ACM 2009, 7 pages (Year: 2009).*

Gorski et al., Service Security Revisited, IEEE 2014, 8 pages (Year: 2014).*

Le et al., Collecting Interaction Traces in Distributed Semantic Wikis, ACM 2013, 11 pages (Year: 2013).*

Pang et al., binpac: A yacc for Writing Application Protocol Parsers, ACM 2006, 12 pages (Year: 2006).*

Ping et al., The Research on Control Algorithm of Logistics Data Exchage Based on XML, IEEE 2009, 4 pages (Year: 2009).*

Tsai et al., Transmission Reduction between Mobile Phone Applications and RESTful APIs, ACM 2011, 6 pages (Year: 2011).*

Zhang et al., ViewDroid: Towards Obfuscation-Resilient Mobile Application Repackaging Detection, ACM 2014, 12 pages (Year: 2014).*

Pooshfam et al., A Web-Based Framwork for Resource Sharing and Collaborative Medical Image Annotation, ACM 2009, 6 pages (Year: 2009).*

The Power of Uniform Resource Location in PHP: http://webmozarts.com/2013/06/19/the-power-of-uniform-resource-location-in-php/, accessed Jul. 15, 2014.

The uuid: URI scheme: http://tools.ietf.org/html/draft-kindel-uuid-uri-00, accessed Jul. 15, 2014.

Widget URI scheme: http://www.w3.org/TR/2011/WD-widgets-uri-20110927/, accessed Jul. 15, 2014.

* cited by examiner

400

SYSTEM AND METHOD TO SECURE SENSITIVE CONTENT IN A URI

BACKGROUND

A uniform resource identifier (URI) is a string of characters used to identify Internet resources by location or by name. For example, a uniform resource locator (URL) is a type of URI that is commonly used by Internet applications to request data from a server. In general, when a server publishes a URI, the URI both identifies a server resource and defines an access path to that resource.

As Internet commerce continues to expand, a URI may increasingly contain sensitive data. There are numerous examples of sensitive information, including bank account numbers, credit card numbers, passwords, social security numbers, access credentials, etc. Such sensitive data may be contained within either path or query components of a URI. For example, in some instances, an OData URI may contain a key predicate that also may contain sensitive information. In another example, OData documents stored and transmitted by a server often contain numerous URIs that may include sensitive information. Understandably, exhibiting such data may give rise to a security breach or a violation of legal regulations.

Data transformation can be used to modify, manipulate, or change sensitive data originating from one or more backend systems before presentation to an end user, while keeping the original data in the backend systems unchanged. In existing systems, access to sensitive data is controlled via user roles that allow or deny the access to entire business objects or documents. For example, sensitive data contained in sales orders or employee data may be secured based on an associated access level of the retrieving user or client system.

Existing approaches fail to provide detailed access control for data transformation without significant modifications in backend systems, or complex rule sets that require extensive modifications to customer user interfaces used to access backend systems. However, the desired state of transformation may be to implement detailed access control so that only certain portions of data objects, identifiers, URIs, business objects, documents, or other data are transformed. Accordingly, the inventors have identified a need for an improved system and method for securing sensitive data.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

DETAILED DESCRIPTION

Figure 1:
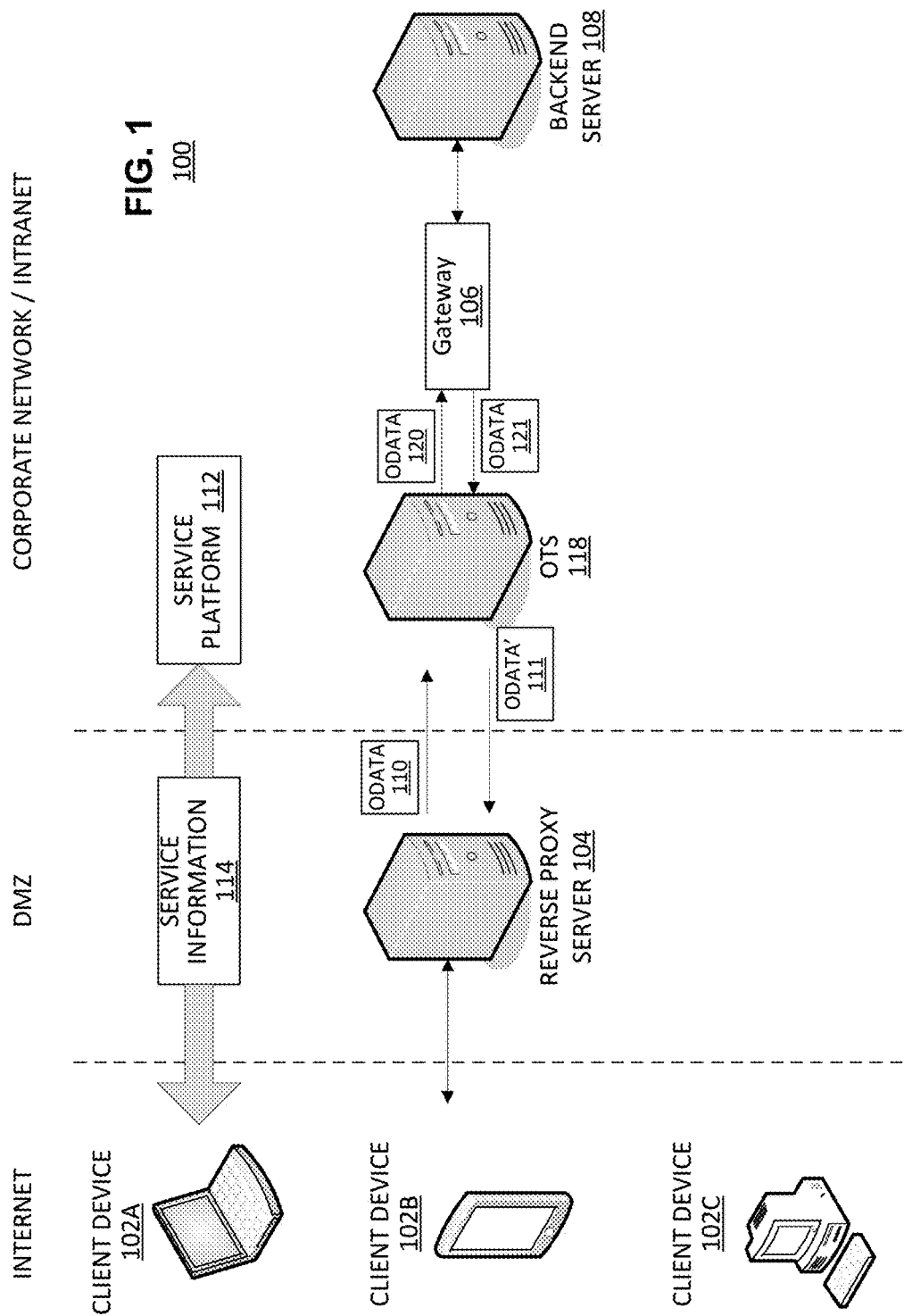
FIG. 1 is a system diagram depicting an architectural overview of a networked system for facilitating web service communications using a data transfer protocol according to an example embodiment.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

The embodiments are generally directed to systems and methods for bijective transformation of any identifier (e.g., a URI) stored on a remote server. The server may replace each original identifier in a response object with a transformed identifier before sending the response object to a client device. The client device may function using the transformed identifiers (e.g., storing identifiers as bookmarks, distributing identifiers to other devices, sending identifiers in requests to the server, requesting a resource document identified by the identifier, etc.). In addition, the server may inversely transform back any transformed identifier into an original identifier. Conversely, a client device must not be able to perform the inverse transformation.

Some of the example embodiments described herein provide a method and system for securing content in URIs for Internet communications, such as standardized Internet communications occurring over an Open Data ("OData") Channel. Although URIs and OData channels are discussed as examples, it should be understood that the embodiments of the invention are not so limited, but rather may be applied to other data objects and data transport methods. In one example, a data transformation solution is configured to intercept OData requests between an OData client (such as a mobile device, personal computer, or other target system) and a backend system (such as a server, ERP, CRM, or other enterprise data source). In some other instances, the data transformation solutions may be applied between servers. Within the Data Transformation Solution, a rule engine, such as a Transformation Engine, may apply various data transformation or manipulation techniques to the data. For example, sensitive information may be obscured behind a key generated on a server. A key may map segments or the entire part of a URI following the service root. A new URI may be composed of the original service root followed by the key. A variety of encryption algorithms or database keys may be used. Key generation mapping the key to a URI fragment as well as mapping back the key to the original URI fragment is solely processed on the server, thereby not exposing any details of key mapping.

Prior to discussing specific example embodiments, further descriptions of some terms are now provided for a better understanding of the descriptions set forth herein.

"Data Transformation," as used herein, may refer to any number of techniques to encode, scramble, mask, disguise, encrypt, substitute, remove, hide, obscure, or otherwise obfuscate the output of sensitive data, whether, in textual, graphical or multimedia format. As one example, data transformation may involve the replacement of an original data value such as a number with a range of numbers surrounding the original number. As another example, data transformation may entirely remove the original data value, mask the original data value, or not provide any indication that the data value (or even the data field) exists. As another example, data transformation may provide misleading data by replacing the original data value with another similar or non-similar data value. The amount, type, and result of data transformation may be dependent on any number of variables, and may be correlated to specific user requirements or access control characteristics.

"OData," as used herein, may refer to the Open Data Protocol, an open web protocol for querying and communicating data using Representational State Transfer (REST) web services. OData enables the creation and use of Hyper-Text Transfer Protocol (HTTP)-based data services, which allow resources identified using Uniform Resource Identifiers (URIs) and defined in an abstract data model, to be published and edited by Web clients using simple HTTP messages. OData typically uses commonly deployed web technologies such as Transmission Control Protocol (TCP), HTTP, Atom Publishing Protocol, XML, and JavaScript Object Notation (JSON) to exchange data between systems. The results of OData queries (payloads) are typically structured in readily parseable formats, such as Atom, JSON, or XML, and may be parsed by any number of client libraries provided by platforms such as .NET, Silverlight, Java, AJAX, PHP, and mobile development platforms. OData, as used herein, may refer to any standardized or non-standardized version of the OData protocol, or like web protocols (e.g., Google Data Protocol (GData)) communicating using REST-based web service communication techniques.

"OData Channel," as used herein, may refer to a channel of communications using OData, provided to connect with a specific enterprise data service to obtain enterprise data. Examples of an enterprise data service include Customer Relationship Management (CRM) services, ERP (Enterprise Resource Planning) systems, MIS (Management Information Service) systems, Content Management (CM) services, Human Resource Management (HRM) services, payment services, accounting or invoicing services, business intelligence services, document management services, or other information system services configured to maintain, provide, or facilitate enterprise or business-related data. Such enterprise data services may be operated in an on-demand manner in a Software-as-a-Service (SaaS) or cloud-based environment, or in a standalone-installation accessible by one or more clients. Examples of enterprise data include, for example and not for limitation, business objects, business documents, notes, bookmarks, annotations, terminology, or any other business data or concepts. In some examples, the enterprise data may be extracted or compiled from heterogeneous sources (e.g., an email database server and a purchase order database). Further, the enterprise data may be structured (e.g., type defined via a schema, such extensible markup language (XML)) or unstructured (e.g., document processing software documents) according to open or proprietary standards.

The present disclosure provides various example methods and configurations to deploy data transformation to modify, manipulate, change, obscure, or hide data that is accessed from backend systems, such as an enterprise data service. The data transformation may be deployed according to predefined rules before presentation of specific data to the end user. The original data in the backend systems, however, is typically intended to remain unchanged.

In an example embodiment, an OData Transformation Service (OTS), is configured to intercept, capture, or otherwise receive OData requests originating from an OData client being transmitted to an OData service. The OTS provides OData access for the OData service hosted by one or more backend systems (e.g., the enterprise data services such as an ERP or CRM system) for the consuming frontend systems/applications (e.g. mobile devices, personal computers, and other consuming clients of the enterprise data services). From the perspective of the consuming clients, the data is sent directly to the backend; and the OTS may not be visible as a separate entity. Thus, the OTS serves as a middle trusted party to implement and facilitate an appropriate level of data transformation. Within the OTS, a rules engine, such as a Transformation Engine, can be used for defining and implementing rules that affect the results and the parameters of data transformation or manipulation operations.

Use of the OData protocol with a solution allows the REST-based exchange of specific types of data and metadata. The OData protocol provides a consuming client with a data access structure that is easier to consume than structured web services such as SOAP-based web services. Specifically, the OData protocol provides for use of a Metadata Document and/or Service Document that describes resources, identified by Uniform Resource Identifiers (URIs) and defined in a data model, to be accessed with create, retrieve, update, and delete operations using simple HTTP messages.

The OData protocol also allows a consuming client to obtain other service URIs, and obtain full XML-based information of the available service model, by access to a single URI of the Service Document. Further, the OData protocol allows a data model to be easily exposed through use of a Metadata Document that describes the structure and organization of resources exposed as HTTP endpoints. A wide variety of client applications, whether complex or simple, may parse the Service Document and the Metadata Document to obtain parameters of the data service, and perform simple HTTP web service communications to communicate with such data service. Data transformation of web-service and OData-based communications also provides flexibility for communication techniques, and removes many of the modifications needed for implementing transformation directly at backend systems. Further, use of a transformation service in an OData-based consumption system helps consumers leverage user relationships and access rules already in place in the enterprise data system. User access controls are likely to already exist in an enterprise data source such as an ERP/CRM system, and may be mapped within a transformation engine or other data subsystem of a transformation service.

Throughout the description that follows, OData is described as an example embodiment. However, it should be understood that the transformation and compression techniques described herein are not limited to OData, but can be applied to any data/transport protocol between a client and server using URIs containing business data.

FIG. 1 is a system diagram depicting an architectural overview of a networked system for facilitating web service communications using an OData protocol according to an example embodiment. The OData protocol may use a series of RESTful web service communications, such as HTTP methods (e.g., get, post, put, and delete), to query and interact with data from a data service.

As illustrated, the networked system 100A includes one or more client devices such as client devices 102A, 102B, 102C, being network accessible via an Internet connection, and connected to a reverse proxy server 104 in a network demilitarized zone (DMZ). Client devices 102A, 102B, 103C may include a variety of devices which may include, for example, a mobile device (e.g., mobile phone or a smartphone), a personal computer, a laptop, a tablet, or the like. Although not shown, the "client" device may also be a server device of another network in some instances. Each of the client devices 102A, 102B, 102C is configured to transmit and receive respective OData communications with the reverse proxy server 104. The respective OData communications may include one or more OData requests (such as OData request 110) or the response to such OData requests.

The reverse proxy server 104 is configured to transmit the OData request 110 to an enterprise data system such as a backend service 108 in a corporate intranet/backend network. The gateway 106 may translate requests, such as OData request 110, to other proprietary protocols, such as remote function call (RFC). The backend service 108 may be configured to process the translated request, retrieve data or perform data operations as an appropriate response to a request, and return a response for transmission back to the gateway 106. The gateway 106 will translate the proprietary protocol back to OData. The OData response will then be transmitted from the gateway 106 (which is located in the intranet/backend network), to the reverse proxy server 104, to the appropriate client device 102A, 102B, 102C. Such a path of the OData communications between the device 102A, 102B, 102C and the backend service 108 may be considered an OData Channel.

Backend service 108 may store OData documents containing one or more URIs. One feature of OData is that an OData service provides access to a universe of documents. Each document can be reached through a series of navigations from an initial entry. In addition, navigations are expressed by URIs contained within the documents. In other words, the service comprises a data universe represented by documents, and each document is identified by URIs contained in a document. Accordingly, URIs contained in such OData documents may be used for two purposes. First, the URIs may act as identifiers of the contained resources. Second, the URIs may also enable navigation from one resource to another.

OData transformation service (OTS) 118 may be located between the reverse proxy server 104 and the gateway 106 to intercept OData communications such as the OData request 110. The OTS 118 acts as a middle party with both client and server functionality to handle communications in both directions. The OTS 118 performs functions of an OData server to receive and handle OData requests from client devices 102A, 102B, 102C. The OTS 118 also performs functions of an OData client, to forward incoming OData requests from the client device (102A, 102B, 102C) to the gateway 106 and the backend service 108. The OTS 118 may perform this by forwarding an OData request 120 to the backend service 108, and receiving a corresponding OData response 121.

After receiving the OData response 121 from the gateway server 106 (and correspondingly, from the backend service 108), the OTS 118 can perform the data transformation on the received data. The OTS 118 provides an OData transformation server to transmit an OData response upon completion of the data transformation. The data transformation, as further detailed in the following, may apply various rules to modify the data as retrieved from the backend service 108 into transformed data.

Once the response is transformed by OTS 118, the transformed response may be returned to the client device by OTS 118. As shown, response OData' 111 which contains transformed data is communicated from the OTS 118 to the reverse proxy server 104, for communication to the appropriate client device 102A, 102B, 102C.

In an example embodiment, OTS 118 may obfuscate or transform OTS URIs contained within OData documents stored within backend service 108. OTS 118 may utilize a variety of encryption techniques to replace one or more URIs in an accessed document with generated or transformed URIs before returning the modified document to client devices 102A, 102B, 102C. OTS 118 may include a mapping feature to associate and/or track generated URIs with original URIs.

As discussed above, sensitive information may be obscured behind a key generated on OTS 118. A key may map one or more portions of the URI following the service root. Accordingly, a new URI may be composed of the original service root followed by the key. When the OTS 118 receives one of its own generated URIs, the OTS 118 may retrieve the original URI, and proceed to use existing mechanisms in order to access backend server resources.

The various client devices 102A, 102B, 102C may process and consume other information used with the recognition and access of the OData connection and the OData channel. For example, a service platform 112 may be used to publish service information 114 related to the OData channel (for example, the OData Service Document and Metadata Document) to various consuming clients such as mobile or desktop devices. The service platform 112 may provide facilities to publish and discover such OData service documents, to enable proper establishment of device connections, authentication, and onboarding. For example, the location of the OTS 118 may be indicated by the service information 114 as a replacement for the gateway 106. To the requesting client, the interception of the OData request 110 by the OTS 118 may be fully transparent. In other configurations, a gateway or other component may be used to redirect the OData request 110 to the OTS 118. Other information related to the OData channel and related services may be communicated to the consuming clients directly or indirectly from components located accessible in the DMZ, the corporate intranet, or the Internet.

Thus, the client application is able to consume the OData services provided by the backend and an appropriate level of transformation may be provided without changing the backend or the client application. The OTS 118 may include or integrate with any number of components for performing various degrees of data transformation and manipulation. It is also possible to independently develop the mapping of the OData service to OTS components such as a rules engine, and define the corresponding transformation rules. These transformation rules can be added transparently and even for existing mobile applications that use OData for communication with the backend systems.

Figure 2:
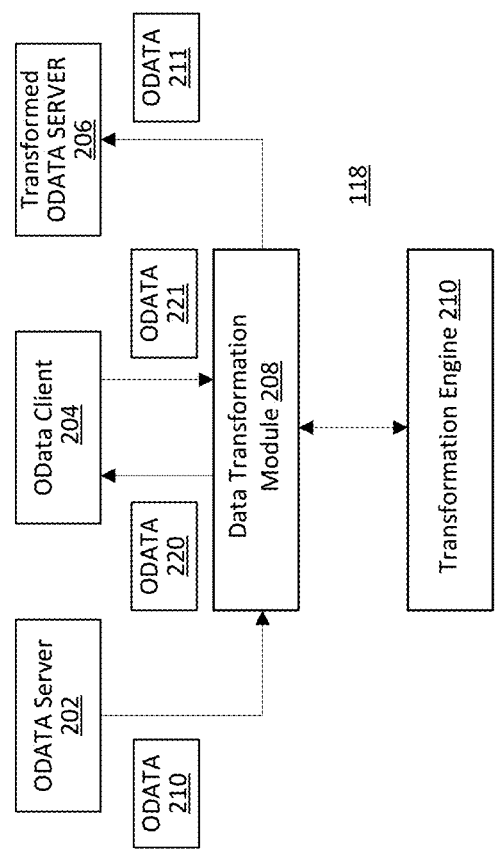
FIG. 2 is a block diagram showing components of a transformation service according to an example embodiment.

FIG. 2 is a block diagram showing components of a transformation service according to an example embodiment.

As depicted in FIG. 2, OTS 118 includes a series of communication components, including an OData Server 202, an OData Client 204, and a Transformed OData Server 206 used to facilitate communications among requesting client devices and backend services. The operations of these communication components are managed by a data transformation module 208, which in turn communicates with a transformation engine 210.

The data transformation module 208 is configured to manage the receipt and transmission of various OData requests. For example, an initial OData request 210 is received at the OData server 202 and communicated to the data transformation module 208 for processing. The data transformation module 208 provides an OData request 220 through OData client 204 to a backend server that accepts OData web service communications. As a result of the web service communication with the backend service, an OData response 221 is received at the OData client 204 and provided to the data transformation module 208.

Data transformation module 208 performs transformation upon the data payload (e.g., URIs, URIs in an OData document, etc.) from the OData response 221. The result of the transformation, OData' response 211, is transmitted to the requesting client using the transformed OData server 206. The data transformation module 208 operates to determine the data within the OData response 221 and apply transformation to the data as appropriate. The data transformation module 208 communicates with the transformation engine 210 to determine the appropriate transformation techniques to apply.

Transformation engine 210 may supply one or more of a variety of encryption algorithms or database keys. For example, the transformed URI can be formed using a symmetric algorithm, such as an encryption algorithm which implements an isomorphism from the original URI to the transformed URI (and vice versa) such that no information is lost, and URIs on both sides are unique. In another example, a server table which associates a unique key with each original URI may be used. The key may then be incorporated as part of the transformed URI. For example, a globally unique identifier (GUID), a hash value calculated from the URI, or other opaque identifier may be used. In any case, the service root is typically unchanged between the original and the transformed URI. Moreover, URI processing is performed on OTS 118 and not externally exposed.

In some instances, a transformed URI may be associated with an expiration date. In addition, the OTS 118 may share the expiration date with client devices within HTTP response headers. Here, OTS 118 may reject a request with an expired URI and return an HTTP code reflecting the rejection. When the URI is expired, a client device can again request the document containing the URI, and hence receive a new and valid version of the transformed URI. After expiration of a transformed URI, a periodic mechanism removes the corresponding entry from the table that associates the URI with its original counterpart and its expiration date. Similarly, the method of removing a corresponding entry from the table that associates transformed and original URIs may be used to block the access to specific resources (documents) by denying their associated transformed URIs. Thus, access to a transformed URI may be enforced without changing the existing OData server mechanisms and the underlying resource representation by documents.

When generating a transformed URI, the service root of the URI typically remains unchanged. The URI has the form <service_root>"/"<rest>. The service root and rest strings may be parsed so that the rest portion may be transformed. The transformed portion is then appended to the service root. In addition, a mapping or lookup table may associate the transformed and original rest portions.

Some example source code for generating transformed URIs is shown below:

Function generateUri(uri): return append( getServiceRoot(uri), mapUri( removeServiceRoot(uri) ));
Function reverseUri(uri): return append( getServiceRoot(uri), revMapUri( removeServiceRoot(uri) ));
Variant 1:

-continued

Table Schema: (guid::IsKey,uriPart::String, expiry::Date).
function mapUri(rest):
   guid= genGuid();
   table.insert(guid, rest, expiry) where the expiry date is set
according to some external settings (e.g. current data plus 8h).
   return encrypt( guid); Comment (Encryption of the guid protects e.g.
the MAC address encoded in the guid)
function revMapUri(key): input key is an encrypted rest of
an URI, see step 3 in function mapUri()
   guid=decrypt(key)
   row = table.retrieve (guid)
   When the row is not existing or when the current date is after the
expiry data then return error "non existing".
   Otherwise, return row.uriPart; Comment: which is the uriPart
indexed by guid.
Variant 2: Direct encryption
function mapUri(rest):
   Return encrypt(rest);
   function revMapUri(key): input key is an encrypted rest of an URI
   Return decrypt(key);

As discussed above, the OTS 118 communicates with a client device using transformed URIs to hide sensitive data. However, a client may supply additional queries by appending one or more queries to a transformed URI. For example, the form of the URI may be <transformedUri>"?"<query>. Appended queries may contain sensitive data that also needs to be transformed. Here, the transformed URI may not be manipulated by a consuming client since the mapping function may not be known to the client device, and may only be stored at the OTS 118.

Accordingly, to protect sensitive data that may be contained within an appended query portion of a URI, the query portion may be encrypted. For example, the form of the URI may be <transformedUri>"?"<encodedQuery>. In some instances, the query portion may be encrypted using an encrypted GUID, a hash value computed from the query portion, and/or other opaque identifiers. In addition, the encryption can be done either on the server using symmetric encryption or on the client device using asymmetric encryption.

The OTS 118 or backend system recognizes that when a URI contains the token "?", the portion following the token is the query part. An additional request header parameter may also be used to notify OTS 118 about the manner for decoding the query part. The request header used for encoding the query part on the server can be the same as the header used to send the actual request. In other words, when a client device encodes the query portion, it may use the same header when requesting the queried data. Some example encryption techniques will now be provided.

For example, local encryption may be used to encrypt the query portion on the client device. This technique may be used when the query part is sufficiently short that its encrypted version will not violate length limitations. Here, the client device may retrieve a "public" key from the OTS 118 (e.g., using a get request) and may encrypt the query using the public key. During a request, a header parameter may be used to indicate local encryption. The OTS 118 may decrypt the query part using a private key. In addition, the OTS 118 may decode the transformed portion of the URI. The original URI and the decrypted query portion may then be appended and used to retrieve information from the backend server.

In another example, server based encryption technique may be used. Here, the client device may transmit a post request to an encoding service on OTS 118. The body of the request may contain the query portion. The request may also include a header which indicates server side encryption. Next, the encryption service of OTS 118 encrypts the query string using a symmetric encryption algorithm. The encrypted query portion is returned to the client devices. The client device may then append the encrypted query to a transformed URI. In some instances, the server may employ GUID based encoding techniques.

Figure 3:
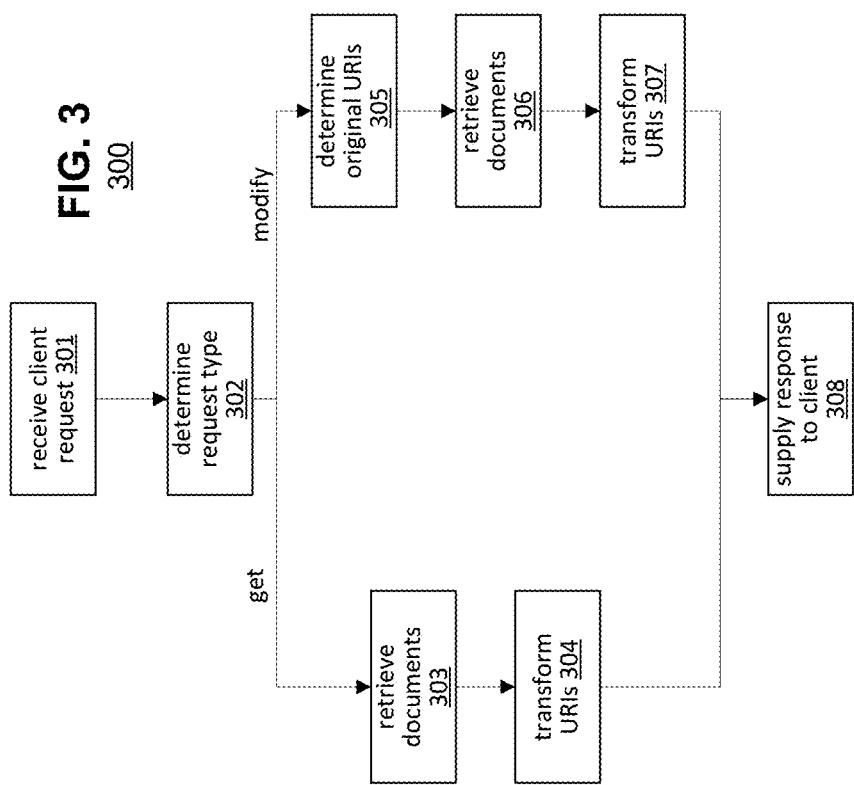
FIG. 3 illustrates a method for processing a request from a client device according to an example embodiment.

As discussed above, the OTS 118 may function as an OData client, and forward incoming OData requests from a client device to the backend service 108. FIG. 3 illustrates a method for processing a request from a client device according to an example embodiment.

Initially, at step 301, the transformation service receives a client request containing one or more transformed URIs. The client request may be intercepted, redirected, or otherwise provided to the transformation service to facilitate transformation of data in the eventual response to the client request. When the transformation service is implemented, client devices are generally only exposed to transformed URIs. Accordingly, the transformation service maps the transformed URI to the original URI.

Before submitting the transformed URI to the backend server, the transformation service may determine the type of client request being received, at step 302. Example requests include get and modify. The client request may be transmitted using a REST-based protocol such as OData, and may include standard HTTP create, read, update, and delete commands (i.e., post/get/put/delete) to perform data operations according to the data transmission protocol or data format involved in the request.

For example, if the request is a "get" type request, the transformation service retrieves one or more documents from the backend server, at step 303. Such documents may be retrieved using the original un-transformed URI(s). Before satisfying the request(s) of the client device, one or more original URIs contained in the retrieved document(s) are replaced by transformed URIs, at 304. Mapped associations between original and transformed URIs may be stored in a mapping or lookup table. Lastly, at step 308, the modified documents may be supplied to the requesting client. Thus, sensitive data in URIs may be replaced by transformed data which is then communicated from the transformation service to the client device.

In another example, when the request is a "modifying" type request (e.g., post, put, etc.), the request typically contains (or references) one or more input documents. At step 305, previously transformed URIs in this input document are mapped back to the original URIs. Here, URIs contained within the requesting input document may be modified to include the original URI. Next, at step 306, the transformation service may call the modifying function of the backend server with the modified document. When the operation returns a result document (e.g., in a "get" process), the URIs in the result document are replaced with transformed URIs, at step 307. Lastly, the modified result document is supplied to the requesting client at 308.

Thus, after retrieving an OData response from the backend server, the transformation service can perform the data transformation on the received data. Although not shown, if any error occurs while processing a client request, an error response may be returned to the client instead of the requested information.

Figure 4:
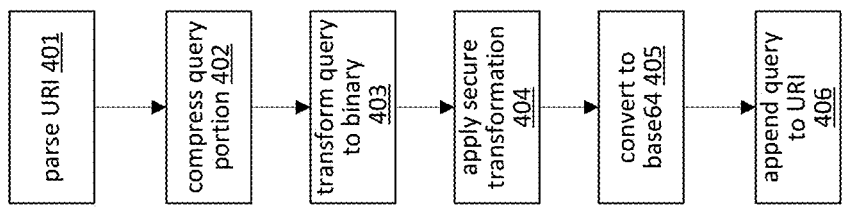
FIG. 4 illustrates a method for processing a request from a client device according to another example embodiment.

FIG. 4 illustrates a method for processing a request from a client device according to another example embodiment.

A client request may append a query to a transformed URI. As the newly introduced query increases the length of the URI and potentially introduces sensitive data, compression and/or encryption algorithms may be applied to the query portion. The length of the query may be too long for inclusion in a client request. The length of a request URI in terms of characters is typically limited by browsers, servers, routers, etc. For example, some Internet browsers use a limit of 2048 characters. As a result, excess characters may be lost during transmission.

As discussed above, sensitive data in a URI may be secured by a variety of encryption techniques. In addition, some of these encryption techniques may further increase the length of the URI. Prior to encryption, a compression algorithm may also be applied to the query portion.

At step 401, parse the URI into an <transformedUri> portion and a <query> portion. As discussed above, the token "?" typically denotes the location of the query portion, and the portion following the token is the query part.

Next, at step 402, select and apply a data compression algorithm to the query portion. A variety of data compression techniques may be applied. For example, a server side dictionary may be used to compress URI parts with critical data. In conventional systems, the compressed data is included with the dictionary. However, according to the embodiments of the invention, the dictionary is not included in the compressed data so that unauthorized external decompression may be avoided. The dictionary size may be relatively small if it is used only for URI fragment parts available on the current system and not for generic text archiving. With a small dictionary size, the compression ratio may be quite high. By decoupling of the compression dictionary from compressed data, and storing it on the server side, the size of the compressed data is further reduced and the possibility of client side decompression is diminished. In some instances, the compression techniques may be enhanced by using statistic based ordering of the dictionary on the server side so as to increase the compression ratio. By applying dictionary usage statistics, variable length encoding may allow for the assignment of shorter replacement codes for frequently used dictionary blocks and longer replacement codes for infrequently used dictionary blocks. As a result, the compression ratio for the URI may be further increased.

In some instances, multiple dictionary versions or a set of dictionaries may be used. Here, the dictionary version being used may be stored on the server so as to reduce the risk of unauthorized external decompression. When a set of dictionaries is being used, a randomized index, stored on the server, may be used to identify the dictionary being used. For example, different URIs may be compressed using different dictionaries. In other words, a first dictionary may be applied to a first original URI and a second dictionary may be applied to a second original URI. Here, a first pointer to the first dictionary may be associated with a first transformed URI and a second pointer to the second dictionary may be associated with a second transformed URI. In yet another alternative example, different dictionaries or dictionary versions may be used for different URI fragment patterns. In other words, a first dictionary may be applied to a first portion of the original identifier and a second dictionary may be applied to a second portion of the original identifier. Here, a first pointer to the first dictionary may be associated with a transformed first portion of the original URI, and a second pointer to the second dictionary may be associated with a transformed second portion of the original URI. In yet another alternative example, different dictionaries may be applied to different file types, such as a first dictionary for an HTML data object and a second dictionary for an XML file type. Of course, when "transformed" URI equals the original URI, a pointer to a dictionary is not needed.

Next, at step 403, transform compressed data to binary format. At 404, apply some secure transformation. At step 405, the query portion may be converted or encoded into a Base64 alphabet (or any other alphabet with characters accepted to direct inclusion into URL) string. Next, at step 406, the processed query portion is appended to the transformed URI (in Base64 form).

Accordingly, the dictionary based server side compression effectively reduces the length of query portions of a URI. In addition, server side compression helps to achieve better compression ratios.

Figure 5:
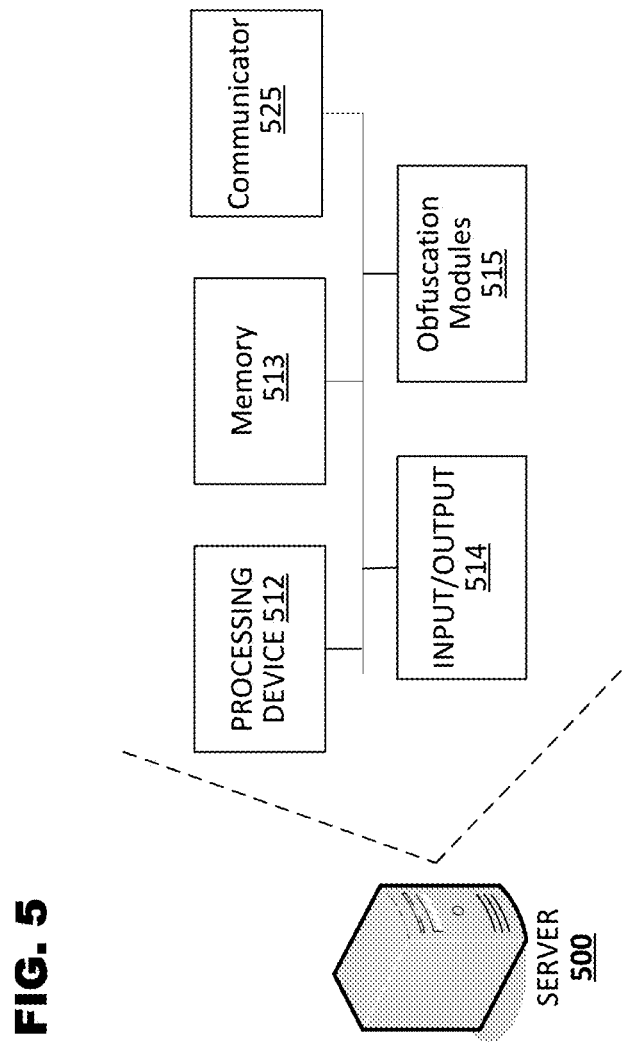
FIG. 5 illustrates a representative architecture of a transformation server according to an example embodiment.

FIG. 5 illustrates a representative architecture of a transformation server according to an example embodiment.

Transformation system 500 may include processing device 512, memory 513, and input/output module 514. Transformation system 500 may also include one or more transformation modules 515 and/or other modules or components that generally implement the functionality of the transformation service. The components and functions of the transformation module 515 are explained in detail with reference to FIGS. 2 and 3. Processing device 512 may execute instructions of transformation and other modules stored in memory 513.

Memory 513 may include a computer readable medium storing transformation modules, which may include instructions associated with modules of the transformation system 500. In an embodiment, memory 513 may contain different components for retrieving, presenting, changing, and saving data and may include computer readable media. Memory 513 may include a variety of memory devices, for example, Dynamic Random Access Memory (DRAM), Static RAM (SRAM), flash memory, cache memory, and other memory devices. Additionally, for example, memory 513 and processing device(s) 512 may be distributed across several different computers that collectively comprise a system. Memory 513 may be capable of storing client and backend inputs. In some instances, a cache in memory 513 may store transformed or original URIs, as needed.

Components of transformation system 500, such as processing device 512, memory 513, and a communications device 525, may be interconnected via a system bus. In various embodiments, the device 500 may have an architecture with modular hardware and/or software systems that include additional and/or different systems communicating through one or more networks via communications device 525.

Communications device 525 may enable connectivity between the processing devices 512 in the device 500 and other systems by encoding data to be sent from the processing device 512 to another system over a network and decoding data received from another system over the network for the processing device 512.

Processing device 512 may perform computation and control functions of a system and comprises a suitable central processing unit (CPU). Processing device 512 may include a single integrated circuit, such as a microprocessing device, or may include any suitable number of integrated circuit devices and/or circuit boards working in cooperation to accomplish the functions of a processing device. Processing device 512 may execute computer programs, such as object-oriented computer programs, within memory 513.

Although example transformation services are depicted as a single entity, it is to be appreciated that the or any similar transformation service may include fewer or more modules and components, and integrated into a single system or from the operation of independent systems and subsystems. For example, the transformation engine may operate as a stand-alone service which provides data to the transformation server regarding applicable policies and rules. Further, additional and different modules and other types of integration with the backend service or the requesting client device may be provided for the transformation server.

Each of the client devices, the reverse proxy, the transformation server, the gateway, the backend service, and other processing components depicted in FIG. 1, FIG. 2, and FIG. 5 may be embodied, individually or in combination, in a computing device in the form of, for example, a personal computer, a server computer, a mobile computer, or any other suitable computing device. In various embodiments, the computing device may be used to implement computer programs, logic, applications, methods, processes, or software to provide data transformation operations, as described herein. Although mobile client scenarios are illustrated, it will be understood that the applicability of the presently described data transformation techniques and components are not limited to mobile client scenarios. A variety of clients and client types (including combinations of mobile and non-mobile client types) may be used.

With respect to the depicted system configurations depicted, it should be appreciated that in other embodiments, the systems and network configurations may include fewer or more components apart from those shown. For example, in example embodiments, the data services provided in the corporate intranet/backend can be integrated within fewer or additional components. The components and respective modules may be in the form of software that is processed by a processor. In another example, the components and respective modules may be in the form of firmware that is processed by application specific integrated circuits (ASIC), which may be integrated into a circuit board. The components and respective modules also may be in the form of one or more logic blocks included in a programmable logic device (for example, a field programmable gate array). The components and respective modules may be adapted, and/or additional structures may be provided, to provide alternative or additional functionalities beyond those specifically discussed.

It will be apparent to those skilled in the art that various modifications and variations can be made in the system and method to secure sensitive URI content of the present disclosure without departing from the spirit or scope of the disclosure. Thus, it is intended that the present disclosure cover the modifications and variations of this disclosure provided they come within the scope of the appended claims and their equivalents.

We claim:

1. A computer-implemented method for exchanging data using a data transfer protocol between a first device and a second device, the method comprising:
   sending a public key to the second device for encrypting an encoded query;
   receiving, at the first device, a first request from the second device, the first request comprising a first transformed identifier, the encrypted encoded query, and a header parameter, wherein the first transformed identifier is associated with a first expiration date, wherein the first request is received prior to the first expiration date, and wherein the header parameter indicates local encryption;

determining an original identifier associated with the first transformed identifier based on the first request being received prior to the first expiration date;
retrieving a response object associated with the original identifier, the response object including one or more identifiers, the one or more identifiers transformed by a data compression algorithm, the data compression algorithm utilizing one or more dictionaries;
transforming the response object by transforming, based on an access control level of the second device, each identifier contained in the response object;
sending the transformed response object to the second device;
receiving, at the first device, a second request from the second device, the second request containing a second transformed identifier, wherein the second transformed identifier is associated with a second expiration date, wherein the second request is received after the second expiration date; and
sending data, to the second device, comprising a return code indicating that the second request was rejected based on the second request being received after the second expiration date.

2. The method according to claim 1, wherein a first dictionary is applied to a first portion of the original identifier and a second dictionary is applied to a second portion of the original identifier.

3. The method according to claim 2, wherein a first pointer to the first dictionary is associated with a transformed first portion of the original identifier, and a second pointer to the second dictionary is associated with a transformed second portion of the original identifier.

4. The method according to claim 1, wherein a first dictionary is applied to a first original identifier and a second dictionary is applied to a second original identifier.

5. The method according to claim 4, wherein the first transformed identifier comprises a third transformed identifier and a fourth transformed identifier, wherein a first pointer to the first dictionary is associated with the third transformed identifier and a second pointer to the second dictionary is associated with the fourth transformed identifier.

6. The method according to claim 1, wherein a pointer to a dictionary used for transformation is associated a transformed identifier.

7. The method according to claim 1, wherein no pointer to a dictionary is associated with an identifier indicating that the transformed identifier equals an original identifier.

8. The method according to claim 1, wherein the one or more dictionaries are on the first device and are not sent to the second device.

9. The method according to claim 1, wherein the one or more identifiers are URIs.

10. The method according to claim 1, wherein the data transfer protocol standard is an Open Data (OData) protocol standard.

11. A non-transitory computer readable storage medium storing one or more programs configured to be executed by a processor, the one or more programs for exchanging data using a data transfer protocol between a first device and a second device, and comprising instructions for:
sending a public key to the second device for encrypting an encoded query;
receiving, at the first device, a first request from the second device, the first request containing a first transformed identifier, the encrypted encoded query, and a header parameter, wherein the first transformed identifier is associated with a first expiration date, wherein the first request is received prior to the first expiration date, and wherein the header parameter indicates local encryption;
determining an original identifier associated with the first transformed identifier based on the first request being received prior to the first expiration date;
retrieving a response object associated with the original identifier, the response object including one or more identifiers, the one or more identifiers transformed by a data compression algorithm, the data compression algorithm utilizing one or more dictionaries;
transforming the response object by transforming, based on an access control level of the second device, each identifier contained in the response object;
sending the transformed response object to the second device;
receiving, at the first device, a second request from the second device, the second request containing a second transformed identifier, wherein the second transformed identifier is associated with a second expiration date, wherein the second request is received after the second expiration date; and
sending data, to the second device, comprising a return code indicating that the second request was rejected based on the second request being received after the second expiration date.

12. The non-transitory computer readable storage medium according to claim 11, wherein a first dictionary is applied to a first portion of the original identifier and a second dictionary is applied to a second portion of the original identifier.

13. The non-transitory computer readable storage medium according to claim 12, wherein a first pointer to the first dictionary is associated with a transformed first portion of the original identifier, and a second pointer to the second dictionary is associated with a transformed second portion of the original identifier.

14. The non-transitory computer readable storage medium according to claim 11, wherein a first dictionary is applied to a first original identifier and a second dictionary is applied to a second original identifier.

15. The non-transitory computer readable storage medium according to claim 14, wherein the first transformed identifier comprises a third transformed identifier and a fourth transformed identifier, wherein a first pointer to the first dictionary is associated with the third transformed identifier and a second pointer to the second dictionary is associated with the fourth transformed identifier.

16. A communications device comprising:
one or more processors; and
memory storing one or more programs for exchanging data using a data transfer protocol between the communications device and a second device, and comprising instructions for execution by the one or more processors, the one or more programs including instructions for:
sending a public key to the second device for encrypting an encoded query;
receiving, at the communications device, a first request from the second device, the first request containing a first transformed identifier, the encrypted encoded query, and a header parameter, wherein the first transformed identifier is associated with a first expiration date, wherein the first request is received prior to the first expiration date, and wherein the header parameter indicates local encryption;

determining an original identifier associated with the first transformed identifier based on the first request being received prior to the first expiration date;

retrieving a response object associated with the original identifier, the response object including one or more identifiers, the one or more identifiers transformed by a data compression algorithm, the data compression algorithm utilizing one or more dictionaries;

transforming the response object by transforming, based on an access control level of the second device, each identifier contained in the response object;

sending the transformed response object to the second device;

receiving, at the communications device, a second request from the second device, the second request containing a second transformed identifier, wherein the second transformed identifier is associated with a second expiration date, wherein the second request is received after the second expiration date; and sending data, to the second device, comprising a return code indicating that the second request was rejected based on the second request being received after the second expiration date.

17. The communications device according to claim 16, wherein a first dictionary is applied to a first portion of the original identifier and a second dictionary is applied to a second portion of the original identifier.

18. The communications device according to claim 17, wherein a first pointer to the first dictionary is associated with a transformed first portion of the original identifier, and a second pointer to the second dictionary is associated with a transformed second portion of the original identifier.

19. The communications device according to claim 16, wherein a first dictionary is applied to a first original identifier and a second dictionary is applied to a second original identifier.

20. The communications device according to claim 19, wherein the first transformed identifier comprises a third transformed identifier and a fourth transformed identifier, wherein a first pointer to the first dictionary is associated with the third transformed identifier and a second pointer to the second dictionary is associated with the fourth transformed identifier.

* * * * *